United States Patent [19]

Siemon et al.

[11] Patent Number: 5,008,931
[45] Date of Patent: Apr. 16, 1991

[54] MULTI-PURPOSE MODULAR JACK CONNECTION BLOCK

[75] Inventors: Carl Siemon, Watertown; Stephen M. Thomas, Torrington, both of Conn.

[73] Assignee: The Siemon Company, Watertown, Conn.

[21] Appl. No.: 462,341

[22] Filed: Jan. 2, 1990

Related U.S. Application Data

[63] Continuation of Ser. No. 99,423, Sep. 17, 1987, abandoned, which is a continuation-in-part of Ser. No. 706,971, Mar. 1, 1985, Pat. No. 4,712,234.

[51] Int. Cl.⁵ ............................................. H02B 1/10
[52] U.S. Cl. .................................. 379/399; 439/389; 439/529
[58] Field of Search ............... 379/399, 27, 419, 438, 379/442; 439/527, 529, 530, 533, 544, 389, 391, 395, 396, 417, 418

[56] References Cited

U.S. PATENT DOCUMENTS

| | | | |
|---|---|---|---|
| 4,296,991 | 10/1981 | Hughes et al. | 379/442 |
| 4,343,527 | 8/1982 | Harrington | 379/442 |
| 4,494,815 | 1/1985 | Brzostek et al. | 439/544 |
| 4,647,725 | 3/1987 | Dellinger et al. | 379/399 |
| 4,655,529 | 4/1987 | Yokoyama | 439/544 |
| 4,657,334 | 4/1987 | Simmons | 439/544 |
| 4,712,234 | 12/1987 | Below et al. | 379/399 |
| 4,742,541 | 5/1988 | Cwirzen et al. | 379/442 |
| 4,748,651 | 5/1988 | Collins et al. | 379/27 |

FOREIGN PATENT DOCUMENTS 80247  6/1983  European Pat. Off. ............ 439/527

OTHER PUBLICATIONS

Telephony, Rona ad, Oct. 20, 1986.
Telephony, Jan. 3, 1977, pp. 26–27.
Telephony, Jan. 26, 1987, p. 93.

Primary Examiner—James L. Dwyer
Attorney, Agent, or Firm—Fishman, Dionne & Cantor

[57] ABSTRACT

A substantially rectangular modular jack connecting block suitable for use in the connection or mounting of terminal equipment using modular plugs, i.e., wall phones and the like, and including frame portions, cover portions and add-on portions which transform the modular jack connecting block to other types of connecting devices suitable for a variety of other connecting applications is presented.

13 Claims, 15 Drawing Sheets

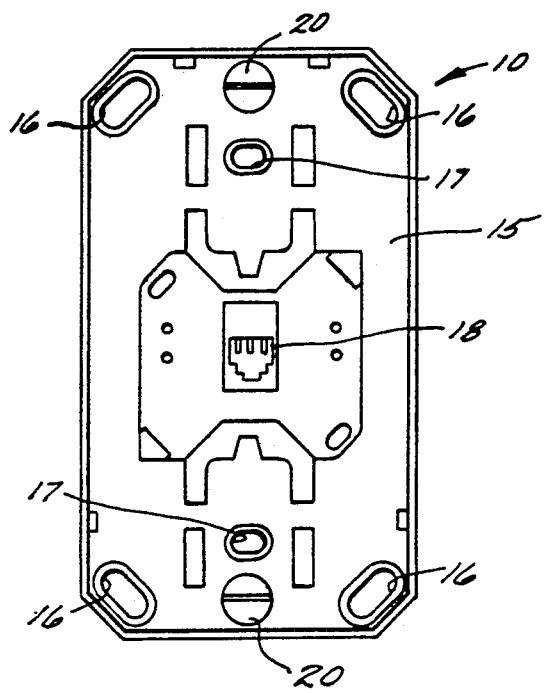
FIG. 1
(PRIOR ART)
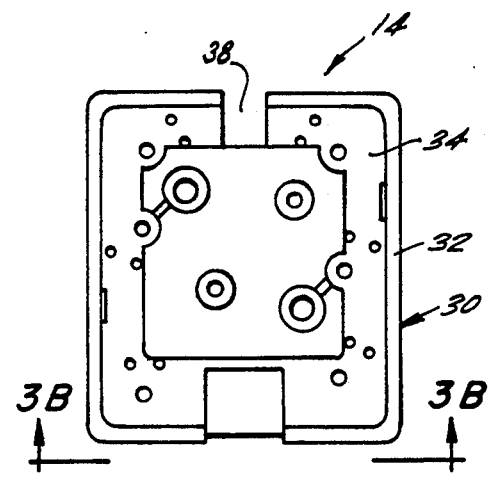
FIG. 3A
(PRIOR ART)
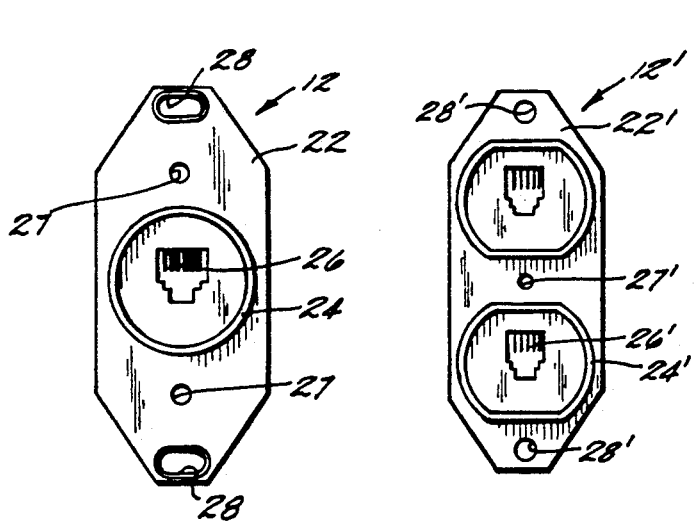
FIG. 2A
(PRIOR ART)
FIG. 2B
(PRIOR ART)
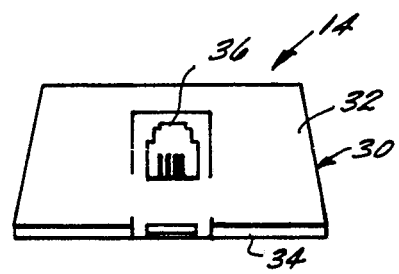
FIG. 3B
(PRIOR ART)

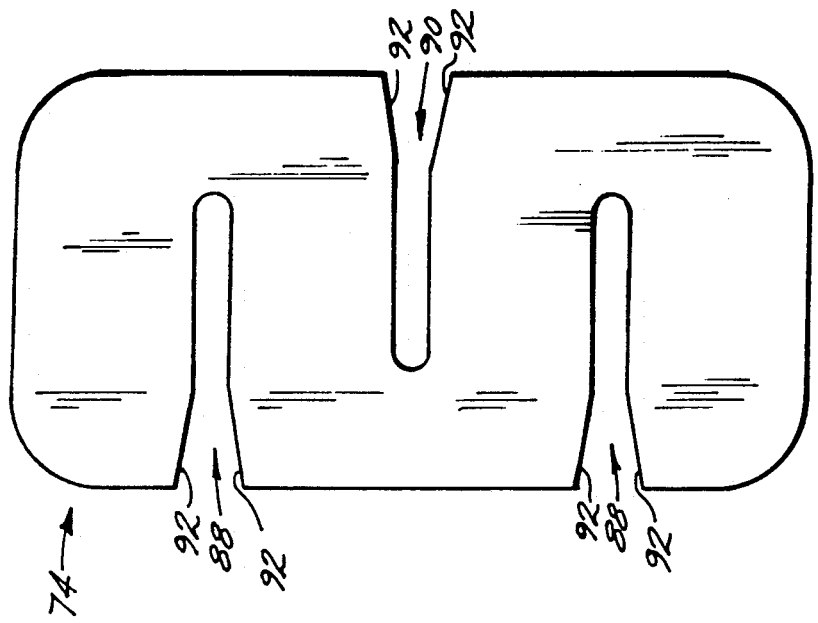
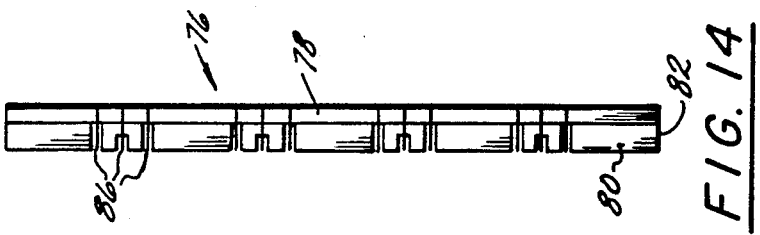
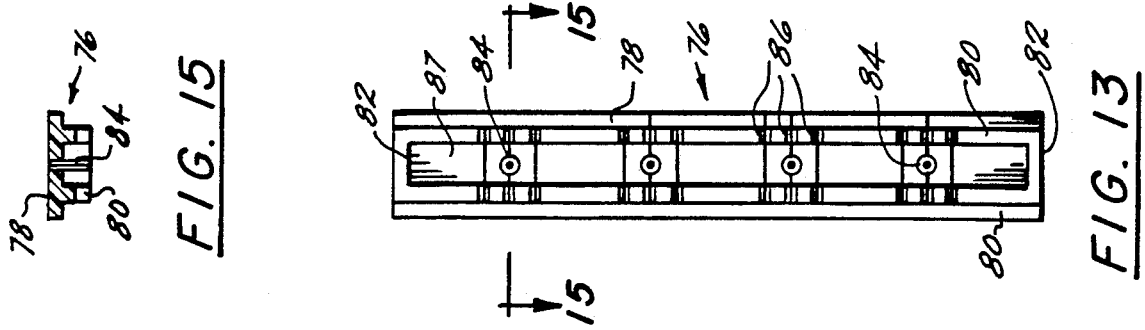

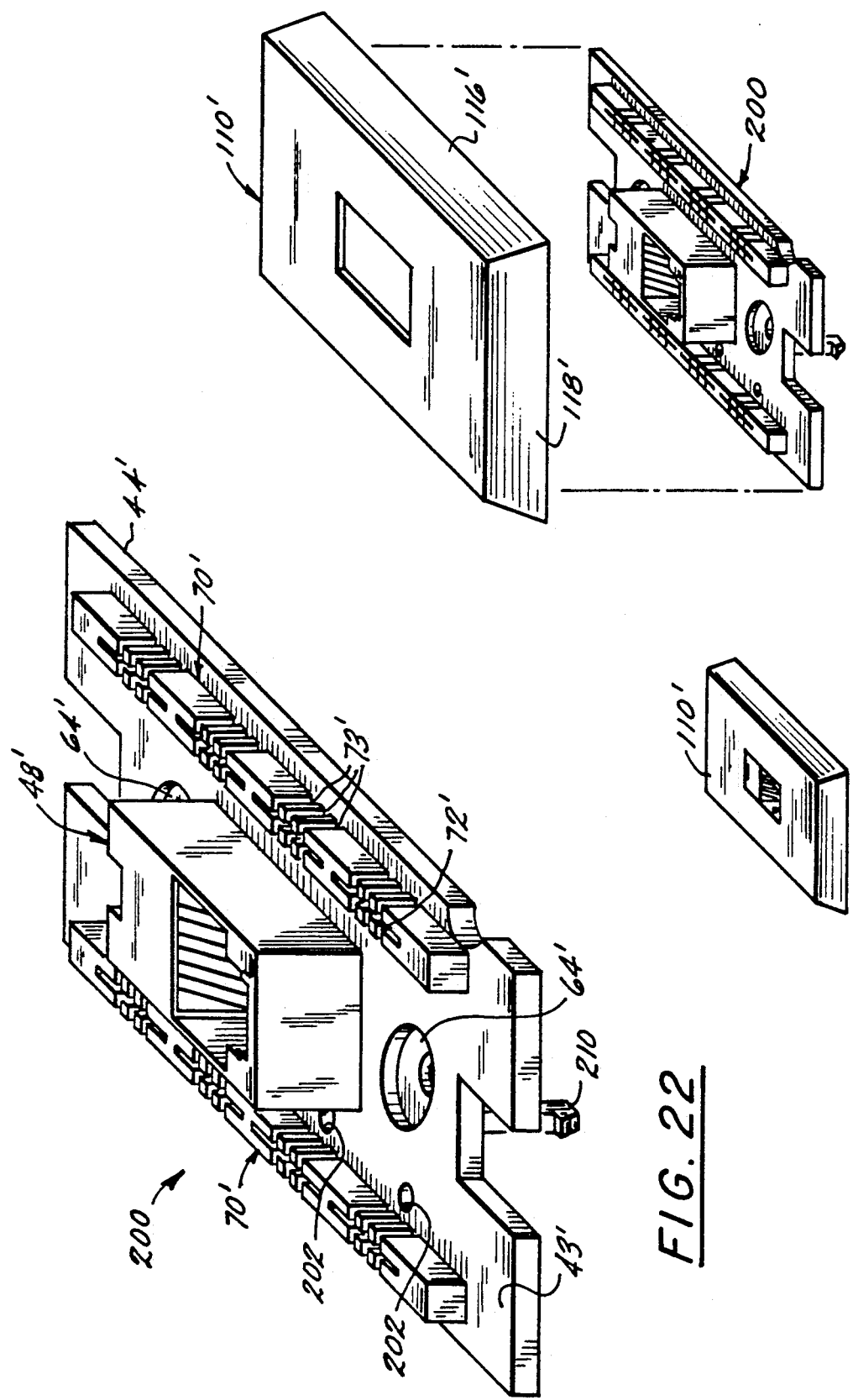

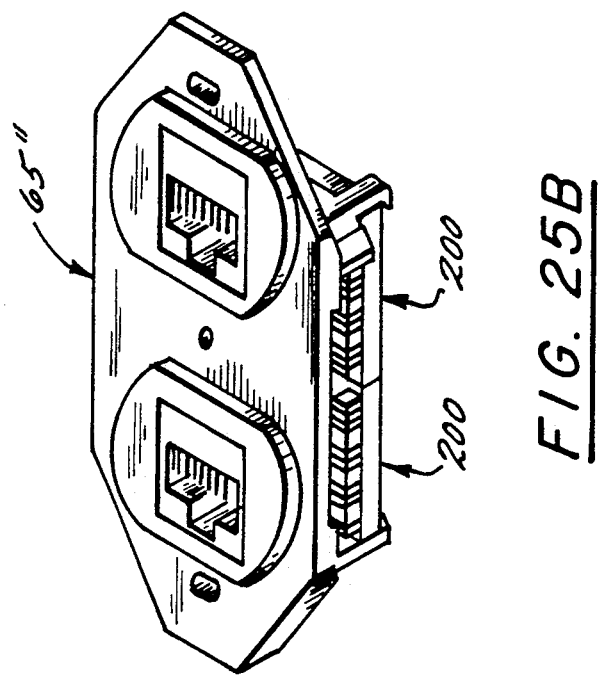
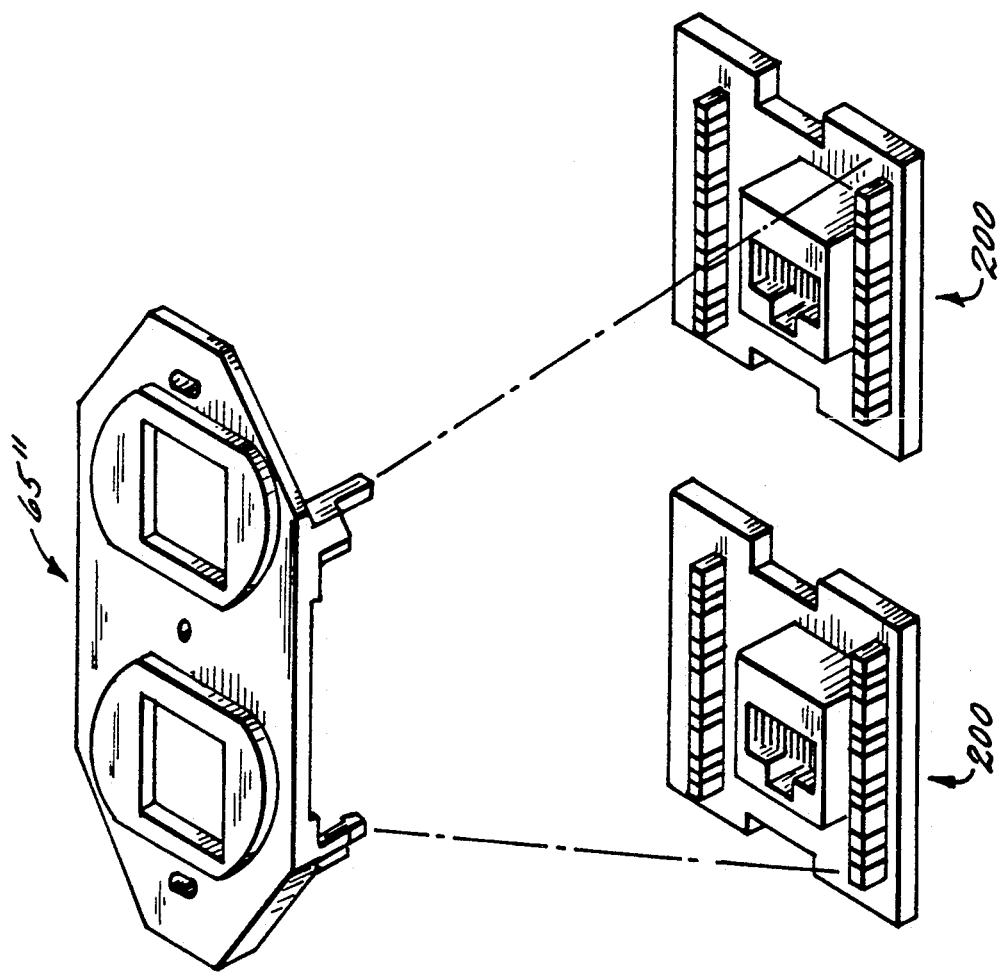
FIG. 25B
FIG. 25A

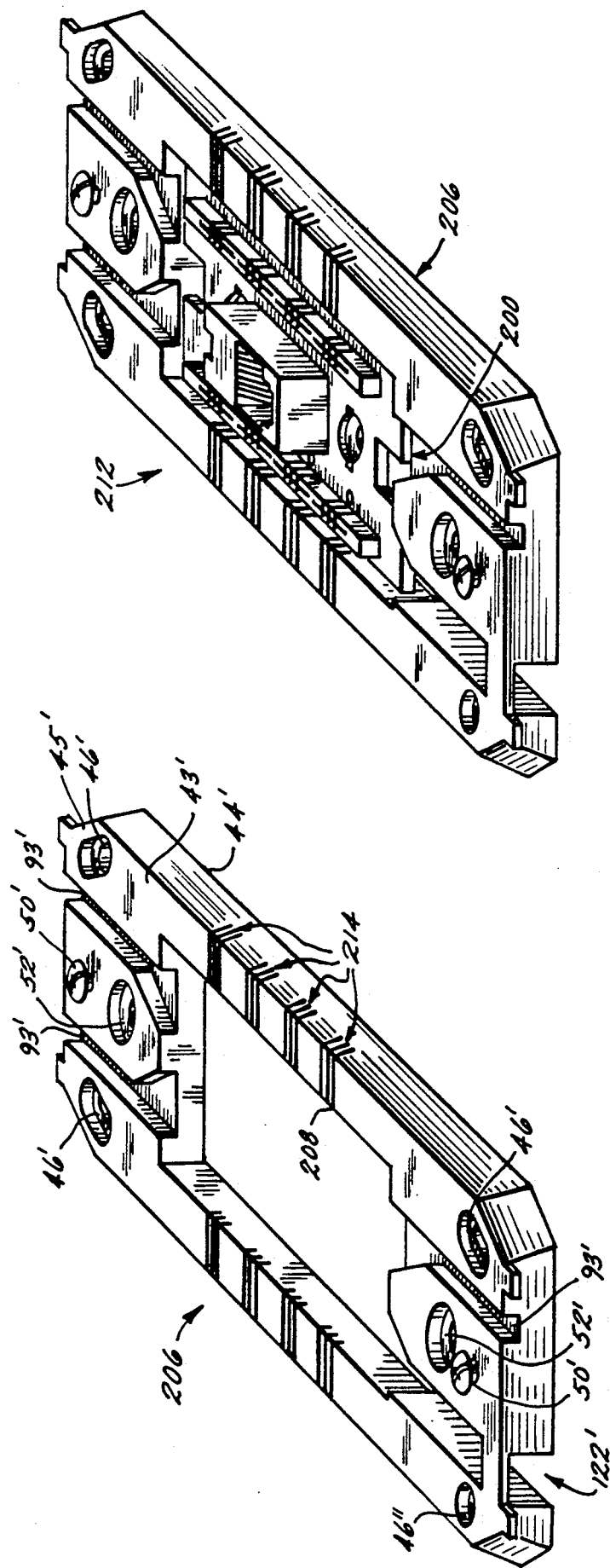

MULTI-PURPOSE MODULAR JACK CONNECTION BLOCK

CROSS-REFERENCE TO RELATED APPLICATION:

This is a continuation of copending application Ser. No. 099,423 filed on 9/17/87 now abandoned, which is a continuation-in-part of U.S. application Ser. No. 706,971 filed Nov. 1, 1985, new U.S. Pat. No. 4,712,234.

BACKGROUND OF THE INVENTION

This invention relates to a modular jack connecting block or plate. More particularly, this invention relates to a new and improved multi-purpose modular jack connecting block which may be used for many applications in the computer and telephonic arts which have heretofore necessitated multiple types of connecting blocks.

Modular jacks (and modular plugs) are currently used throughout the telephonic and related industries. Modular connectors, i.e., jacks and plugs, provide many features and advantages over prior art connectors including ease of connection and disconnection, as well as being a universal standard thereby alleviating purchasing, repair and inventory costs. As a result of the prevalent use of modular jacks and plugs, associated equipment and various devices such as housings, blocks and plates have been developed to form a complete "modular" system of telephonic accessory equipment. In particular, there are presently at least three general types of modular jack connecting blocks or plates which are now extensively used for a variety of separate applications. These three blocks are commonly referred to as either flush or non-flush (surface mounted) blocks.

One such well non-known flush mounted modular jack connecting device is used as a connecting block in attaching wall-mounted telephones to walls, boxes, etc. This connecting plate is shown in FIG. 1 and is comprised of an essentially rectangular, (may be either metallic or plastic) plate having means thereon for effecting attachment to a wall box, other housing or flat surface. This plate also includes a modular jack along with means for attaching a telephone thereon.

A second general type of flush mounted modular jack connecting plates or blocks is shown in FIG. 2 and are typically used in a box on a wall or floor to Provide access between, for example, extension type telephones and the telephone wiring system. Such well-known modular jack connecting blocks usually consist of a substantially octagonal face plate having at least one modular jack, centrally located surrounded by a circular or oval area.

A third general type of non-flush modular jack connecting block is comprised of a square, round or rectangular box having modular jack means on the front or side faces thereof for accepting a modular plug (see FIG. 3). This third type of connecting block is frequently found mounted on walls, baseboards, desks (i.e., office furniture), etc.

The above-discussed general types of modular jack connecting devices are well known to those skilled in the art. It follows that the use of three structurally distinct modular jack connecting blocks suffers from certain economic drawbacks as far as increased (and possibly duplicative) purchasing, manufacturing and inventory costs are concerned. Moreover, the use of three separate connecting plates may be cumbersome to the installer and repair person in the field in that all three types of plates must accompany the worker at all times. Furthermore, it is also well known that each type of block described above utilizes either a 2, 4, 6 or 8 wire modular jack depending upon the modular plug which is used in conjunction therewith. Accordingly, the three distinct types of blocks; flush and non-flush applications; and presence of 2, 4, 6 or 8 wire modular jacks presently necessitates the manufacture and inventory of numerous varieties of modular jack connecting blocks.

SUMMARY OF THE INVENTION

The above-discussed and other problems of the prior art are overcome or alleviated by the modular jack connecting block of the present invention. IN accordance with the present invention, a novel modular jack connecting block is provided which uniquely combines the functions of the three heretofore discussed existing connecting blocks for both flush and non-flush applications.

In a first embodiment, the present invention is essentially comprised of a substantially rectangular modular jack connecting block suitable for use in mounting terminal equipment using modular plugs, i.e., wall phones and the like, and includes both a separable, internal portion and separate add-on or cover plate portions which transform the modular jack connecting block into other types of connecting blocks suitable for connecting a variety of telephonic equipment in flush and non-flush applications. Additionally, a novel modified modular jack which is capable of accepting 2, 4, 6 or 8 wire modular plugs is incorporated into the present invention.

In a second embodiment of the present invention, the system for providing a modular jack connecting block for essentially all conventional applications relies on the interior center portion of the block being no longer detachably connected to the larger block frame. Instead, the interior center portion stands alone and is connectable to a separate larger frame for use in wall phones or the like. This center portion is also connectable to various cover members which permit its use in a variety of interchangeable applications as in the first embodiment.

The novel structure of the present invention provides a modular jack connecting block which may be used interchangeably in numerous applications. The resulting benefits and advantages of the present invention include less inventory and less numbers of parts and consequently great economic savings. Also, a single modular jack connecting block which accomplishes the functions which previously necessitated a large number of plates greatly reduces the workload on the installer or repair person out in the field.

The above-discussed and other advantages of the present invention will be apparent to and understood by those skilled in the art from the following detailed description and drawings.

BRIEF DESCRIPTION OF THE DRAWINGS:

Referring now to the drawings, wherein like elements are numbered alike in the several FIGURES:

FIG. 1 is a front elevation view of a first type of modular jack connecting plate in accordance with the prior art.

FIG. 2A is a front elevation view of a second type of single modular jack connecting plate in accordance with the prior art;

FIG. 2B is a front elevation view of a duplex modular jack connecting plate in accordance with the prior art;

FIG. 3A is a rear elevation view of a third type of modular jack connecting plate in accordance with the prior art;

FIG. 3B is a side elevation view along the line 3B—3B of FIG. 3A;

FIG. 13 is a bottom view of an optional cover used in conjunction with the insulation displacement connector of FIG. 4;

FIG. 14 is a side elevation view of the optional cover of FIG. 13;

FIG. 15 is a cross-sectional elevation along the line 15—15 of FIG. 13;

FIG. 16 is an enlarged elevation view of a connector blade used in conjunction with the insulation displacement connector areas of FIGS. 9-11;

FIG. 22 is a perspective view of a modular jack connector block in accordance with a second embodiment of the present invention;

FIG. 23A is a perspective view of the connector block of FIG. 22 used with a first type of cover plate;

FIG. 23B is a perspective view of the items of FIG. 23A subsequent to assembly;

FIG. 25A is a perspective view of an octagonal adapter that may be used in conjuction with two connector blocks of FIG. 22;

FIG. 25B is a perspective view of the items of FIG. 25A subsequent to assembly;

FIG. 26A is a perspective view of a connector block frame for receiving the modular jack connector block of FIG. 22;

FIG. 26B is a perspective view of the connector block of FIG. 22 and the frame of FIG. 25 subsequent to assembly;

DESCRIPTION OF THE PREFERRED EMBODIMENT

Figure 6:
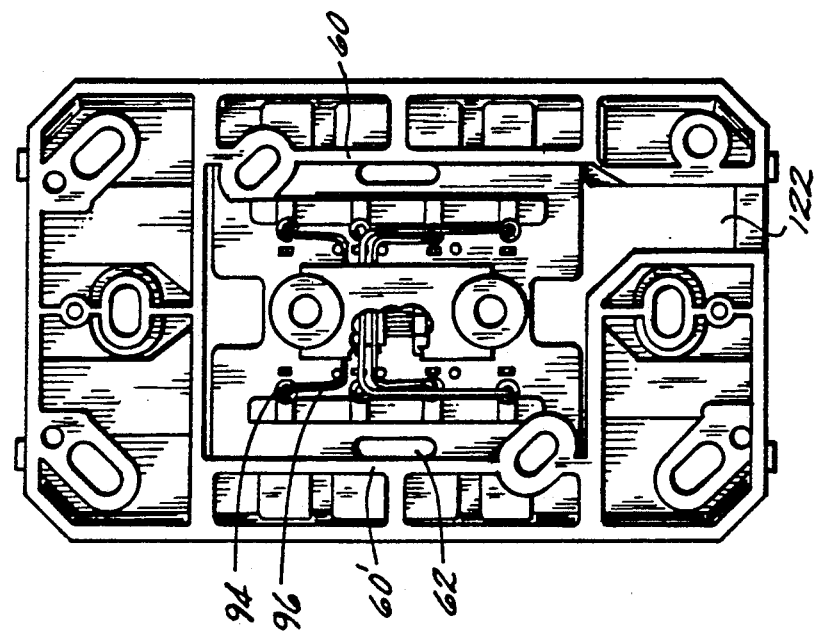
FIG. 6 is a rear elevation view of the modular jack connecting block of FIG. 4.

Referring first to FIGS. 1-3, three general types of modular jack connecting devices in accordance with the prior art are respectively shown at 10, 12 and 14. More particularly, in FIG. 1, a well non-known flush mounted modular jack connecting plate 10 is shown which is generallY well suited for the attachment of wall Phones and the like to boxes, walls, etc. Connecting plate 10 consists of a substantially rectangular plate 15 having openings 16 at the four corners thereof for connection to a wall or suitable box (not shown). Plate 10 may be either conductive metallic or non-conductive plastic. Metallic is more common. Plate 10 also inciudes further mounting holes 17. Standard connecting plate 10 includes a modular jack 18 at about the center thereof which typically is a four or six position (i.e., four or six wire) modular jack. Modular jack connecting plate 10 also includes protrusions 20 or similar means for mounting a wall telephone on the front face thereof. In mounting such a telephone (not shown), a modular plug (not shown) protruding from the telephone is inserted into modular jack 18 to make electrical contact therewith while mounting means 20 effects mechanical attachment therebetween.

Turning now to FIG. 2, a second general type of flush mounted modular jack connecting device 12 and 12' typically used in conjunction with, for example, telephone mounting cords and phones are shown. Connecting devices 12 and 12' consist of a substantially octagonal face plate 22, 22' with a circular (with single jack) area 24 or oval (with double jack) area 24' outlined in the center thereof. This circular or oval area contains a modular jack 25, 26'. It will be appreciated that a decorative outer plate (not shown) can be affixed via screw holes 27, 27' thereby exposing only that portion of plate 22, 22' which includes the circular area 24 or oval area 24' and modular jack 26, 26'. Octagonal connecting devices shown in FIG. 2 are also provided with a pair of mounting holes 28, 28'. Connecting devices 12, 12' are usually mounted in a wall box or floor box.

With reference to FIGS. 3A and 3B, yet another well known type of modular jack connecting device is shown generally at 14. Connecting device 14 is a non-flush wall mount or baseboard mount and consists of a square, round or rectangular box 30 having a cover section 32 and a base section 34. A modular jack 36 is mounted within the interior of box 30 and is positioned along one side thereof (or alternatively along the top face) to receive a modular plug (not shown). Usually, an opening 38 is disposed opposite to modular jack 36 for accessing connecting leads (not shown). Connecting device 14 is usually mounted on a wall, baseboard or any other non-flush mounting application.

As discussed hereinabove, all three prior art modular jack connecting devices 10, 12, 12' and 14 of FIGS. 1, 2A, 2B and 3, respectively, are well known to those skilled in the art. However, it has been found that the use of three structurally distinct connecting block structures suffer from some rather important economical deficiencies. Thus, end-users of such plates are required to purchase and inventory all three devices which can be quite expensive. Similar duplicative costs are incurred by the manufactures and wholesaler. Finally, the repairer and installer often finds it quite burdensome to equip and utilize all three types of connecting devices. Moreover, these drawbacks are multiplied even further as all three prior art connecting devices must utilize one of three distinct two, four, six or eight wire modular jacks.

The above-discussed and other drawbacks of the prior art modular jack connecting devices of FIGS. 1, 2A, 2B, 3A and 3B are overcome by the modular jack connecting block of the present invention shown in FIGS. 4–8. Moreover, the modular jack connecting block of the present invention provides many other features and advantages heretofore not found in the prior art.

Figure 5:
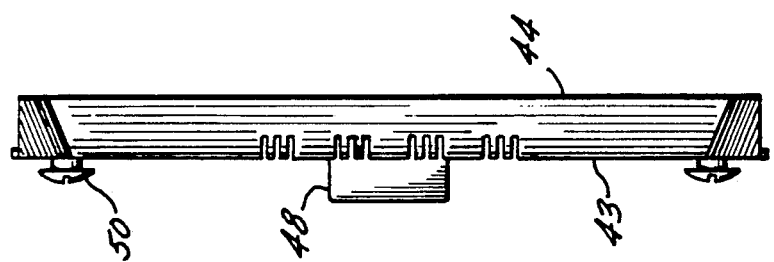
FIG. 5 is a side elevation view along the line 5—5 of FIG. 4.
Figure 4:
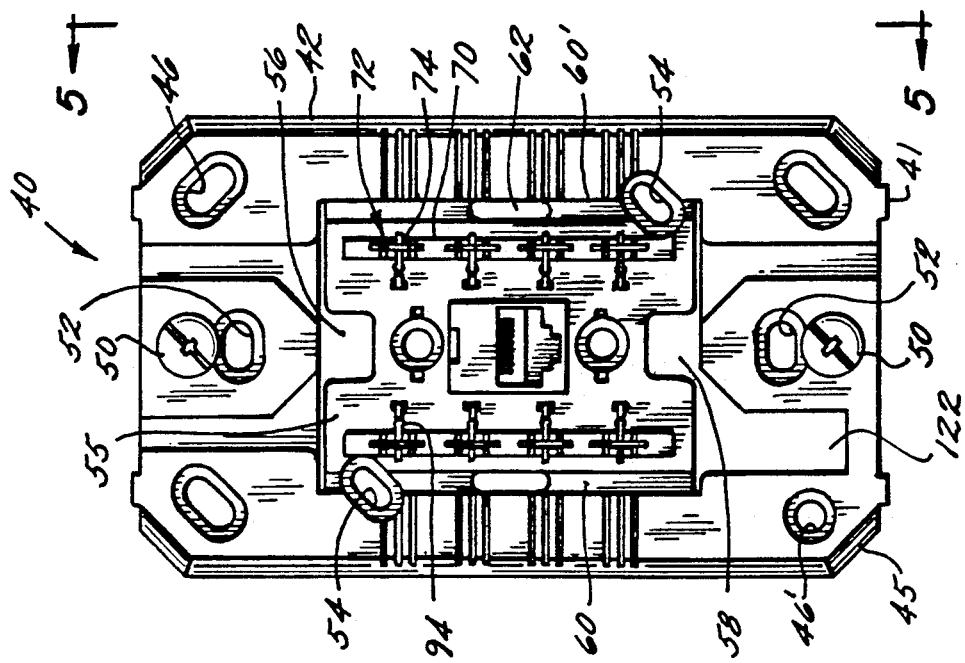
FIG. 4 is a front elevation view of a modular jack connecting block in accordance with the present invention.

Referring simultaneously to FIGS. 4–8, a modular jack connecting block in accordance with the present invention is shown generally at 40. In essence, the novel structure of connecting block 40 overcomes the above-discussed problems by combining the functions of all three prior art connecting devices 10, 12 and 14 of FIGS. 1, 2 and 3, respectively. Modular jack connecting block 40 comprises a substantially rectangular electrically nonconductive (i.e., plastic) plate 42 having front and rear faces 43 and 44, respectively. Each corner 45 of plate 42 is preferably diagonally cut and includes an opening or mounting hole 46 for attachment thereof to a wall. Note that due to limited space requirements, one hole 46' is substantially circular in shape while the other holes 46 have an oval shape. At about the center of plate 42 is a modular jack 48. Modular jack 48 is preferably flush with the rear face 44 of plate 42 while it protrudes outwardly from the front face 43 (see FIGS. 5 and 8). Modular jack 48 is well known and has an opening therein for receiving a well known modular plug. As shown in FIGS. 4–6, connecting plate 42 is quite similar to prior art connecting plate 10 of FIG. 1. Thus, modular jack connecting block 40 as shown in FIGS. 4–6 is well suited to be used in conjunction with attaching a wall phone or the like to a wall, box or other suitable mounting. It will be appreciated that a wall phone or the like is attached to plate 42 via a pair of connecting tabs or studs 50 as shown in FIG. 4 and 5. Tabs 50 will communicate with corresponding openings in a wall phone or the like (not shown) to effect attachment therebetween.

Modular jack connecting block 40 is preferably provided with still other mounting holes to effect mounting on almost any well known box or bracket. Thus, openings or mounting holes 52 are located between tabs 50 and are well suited for mounting conventional AC boxes. Additionally, mounting holes 54 are provided diagonally across from each other along the interior of plate 42 for mounting onto certain other known brackets and electrical boxes. Thus, connecting block 40 may be easily and quickly mounted on a plurality of known brackets and wall boxes.

Figure 8:
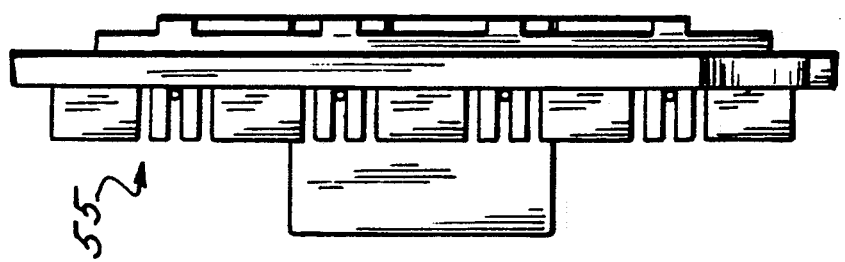
FIG. 8 is an enlarged side elevation view along the line 8—8 of FIG. 7.
Figure 7:
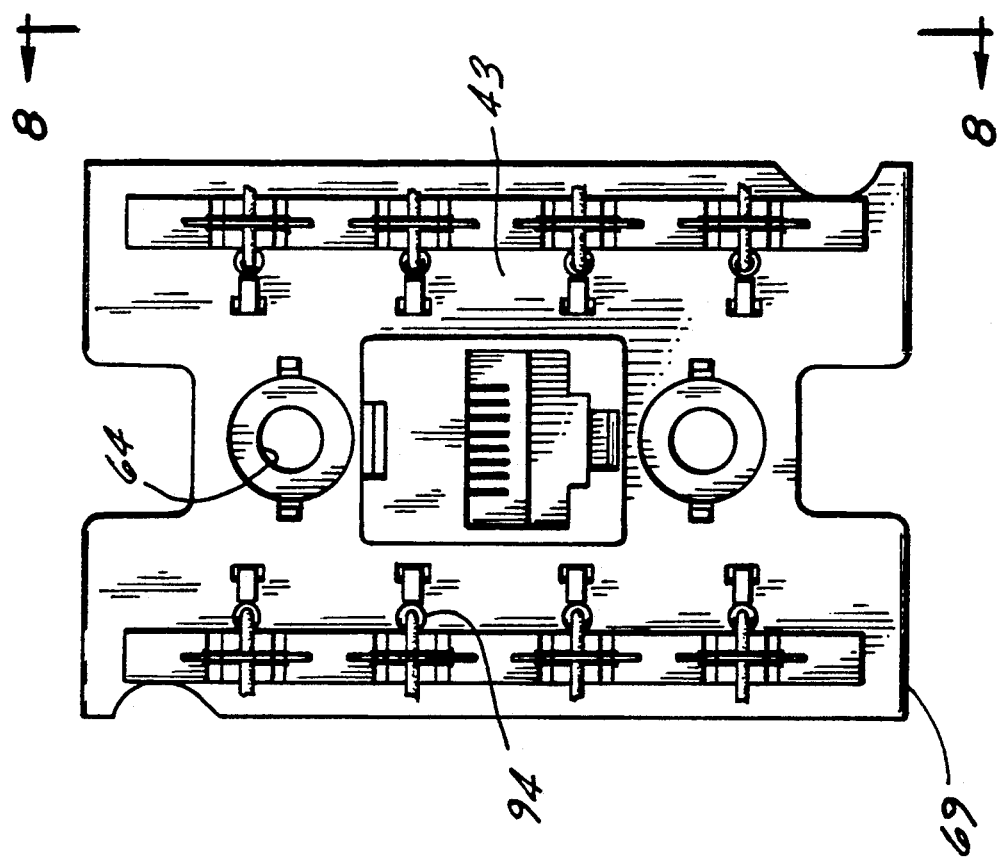
FIG. 7 is an enlarged front elevation view of the separable internal portion of the modular jack connecting block of FIG. 4.
Figure 10:
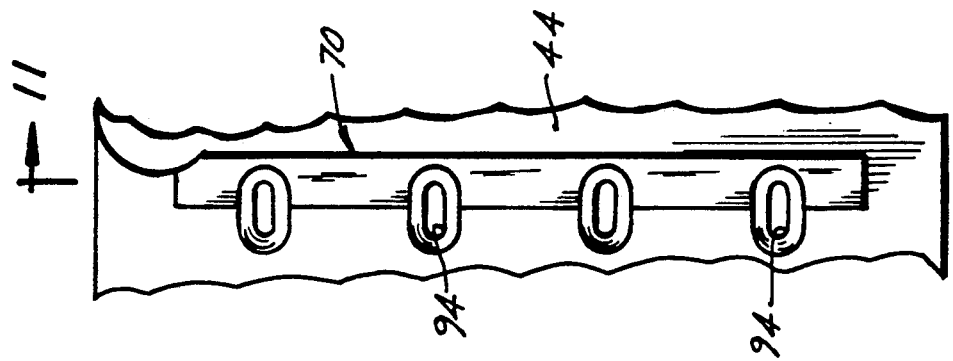
FIG. 10 is an enlarged rear elevation view of one of the insulation displacement connector (IDC) areas shown in FIG. 6.
Figure 11:
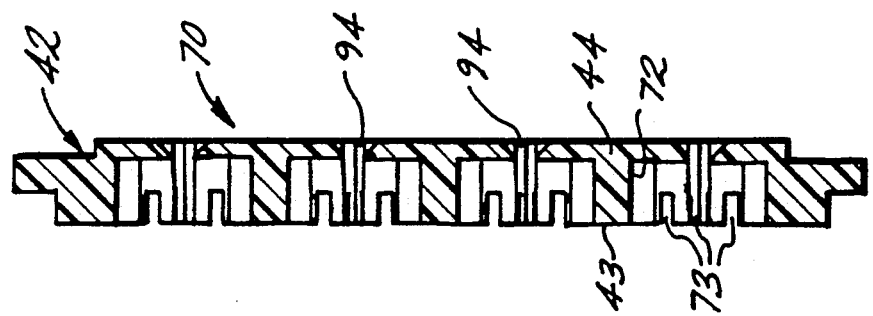
FIG. 11 is a cross-sectional elevation view along the line 11—11 of FIG. 10.

An important feature of the present invention is the presence of at least one rectangular break-out or cut-out region 55 in the interior portion of connecting plate 42 as shown in FIGS. 7 and 8. This separable break-out section 55 is defined by the voids 56 and 58 and the lines 60 and 60' (FIGS. 4 and 6). It should be understood that lines 60 and 60' are actually a recessed portion of plate 42 wherein the thickness of plate 42 is reduced relative to most of the other portions of the plate. Thus, when rectangular region 55 is broken or snapped away from the surrounding plate 42, a structurally distinct modular jack connecting block, structurally and functionally similar to the interior non-flush connecting plate 34 of FIG. 3A, is created. Mounting holes 64 are provided to snap-out portion 55 to effect mounting thereof onto baseboards, walls or other non-flush mounting applications. Preferably, pry slots 62 are provided on either side of lines 60, 60' to facilitate the breaking or snapping out of interior section 55. It will be appreciated that subsequent to breaking out separable interior section 55, the remaining portion of connecting plate 42 will have a central opening therethrough.

Referring now to the FIGS. 4, 6 and 9–16, in a preferred embodiment of the present invention, modular jack connecting block 40 is provided with eight insulation displacement connectors (IDC's) four of which are shown generally at 70. It will be appreciated that IDC's in area 70 protrude upwardly from the surface 43 defined by the interior portion 55. Each insulation displacement area 70 comprises four longitudinal slots 72 (FIG. 11) for receiving and holding four connector blades 74 (FIG. 16) and four groups of three parallel slots 73 (slots 73 being perpendicular to slots 72) for accessing wires or leads into and out of the IDC. Longitudinal slots 72 are surrounded by a pair of longitudinal sidewalls and a pair of end walls, with the longitudinal sidewalls including the groups of parallel slots 73 therein.

Figure 9:
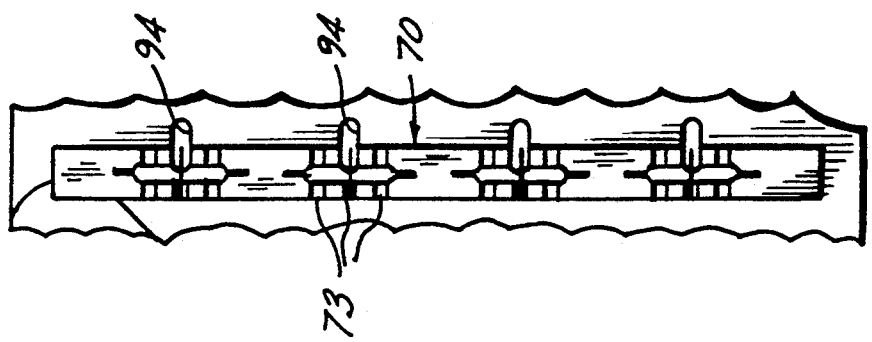
FIG. 9 is an enlarged front elevation view of one of the insulation displacement connector areas shown in FIG. 4.
Figure 12A:
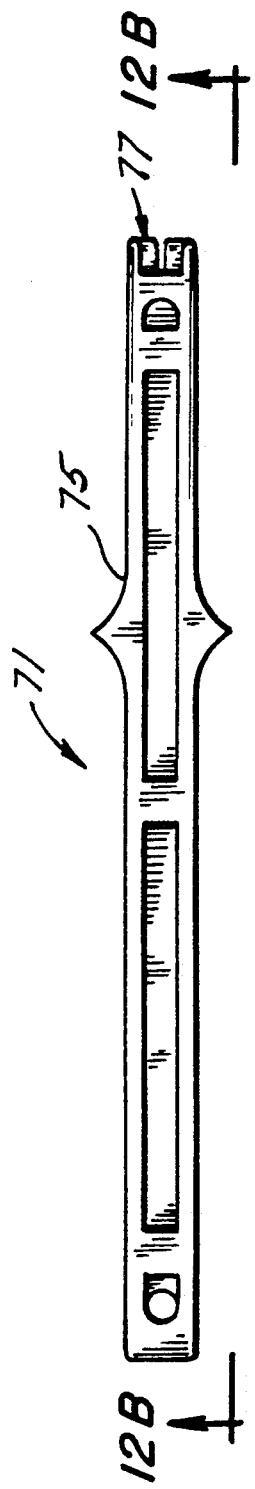
FIG. 12A is a front elevation view of a wire installing tool used in conjunction with the insulation displacement connectors of FIGS. 4 and 7.
Figure 12B:
FIG. 12B is a side elevation view of the wire installing tool along the line 12B—12B of FIG. 12A.

The IDC areas shown in FIG. 9 are sized to accomodate use of a termination tool 71 (FIG. 12A). By first placing an insulated wire (not shown) in the longitudinal slots 73 over IDC blade 74, then scabing the wire with termination tip 77 of tool 71, the wire is connected. It is appreciated that the tool 71 may be equipped with finger grips 75 or attachment means for handles or impact tools common to the art. Termination tool 71 may be equipped with or without wire cut-off means (not shown) as a labor saving measure. Referring to FIG. 12A, it will be appreciated that the various recesses shown are for material reduction and may or may not be provided as shown.

Each IDC area 70 is sized to receive an optional, substantially rectangular cover 76 (see FIGS. 13-15). Cover 76 comprises a rectangular top section 78 with depending longitudinal sidewalls 80 and end walls 82. Note that top section 78 overhangs depending sidewalls 80. Longitudinal sidewalls 80 include four groups of three parallel openings or slots 86 corresponding to each group of three vertical slots 73. Optional cover 76 is sized so as to be received in the open space 87 (space 87 being defined by sidewalls 80 and end walls 82), of the IDC area 70 shown in FIG. 9. (It will be appreciated that the cover 76 and blades 74 have been removed from the block 40 in FIGS. 4 7, 8 and 10). Cover 76 preferably includes a plurality of test holes 84 for receiving a test probe.

An enlargement of an IDC contact or connector blade 74 used in accordance with the present invention is shown in FIG. 16. Electrically conductive connector blade 74 includes a pair of connector sites 88 for interfacing incoming and outgoing leads and a third connector site 90 for interconnection with a lead from the modular jack. Preferably, each connection site 88 and 90 has converging side portions 92 which act to strip the insulation on the leads and effect electrical contact.

Insulation displacement connectors in area 70 are utilized by loading wires or leads (not shown) into connection sites 88. The leads 96 from the modular jack being connected to connection sites 90. It will be appreciated that the leads or wires from the modular jack 48 are brought from the rear surface 44 into the front surface 43 of plate 42 via the plural access openings 94 shown in FIGS. 4, 6, 7, 9, 10 and 11. Thereafter, the tool 71 or optional cap 76 is disposed over IDC area 70 wherein the tool 71 or cap 76 will act as a wire installation tool by frictionally engaging the protruding side and end walls of IDC 70 and urging the leads into mechanical and electrical attachment with blades 74. Note that subsequent to placing the optional cap in position, the leads will enter and exit the interior of the IDC through slots 73 and 86. The IDC's used in conjunction with the present invention permit wiring on the front face 43 of plate 42 or section 55. Front face wiring is easier and more convenient relative to back face wiring and is therefor a labor saving feature of connector block 40. It should be understood that voids 56 and 58 also function as a means for allowing any wiring from inside a box or wall to be brought onto the front face 43 for connection to the IDC's. Other incoming or outgoing leads or wires may access connector plate 42 via the several slots or recesses 93 which are provided for that purpose on the front face 43 of plate 42 as shown in FIG. 4.

The use of insulation displacement connectors in conjunction with the modular jack connecting block of the present invention provides many features and advantages over prior art wiring methods. For example, the IDC's permit relatively quick and easy installation and repair. Moreover, the IDC's allow for increased flexibility in wire configurations and designs as the IDC connections may be easily removed (disconnected) and rewired as desired.

Figure 17C:
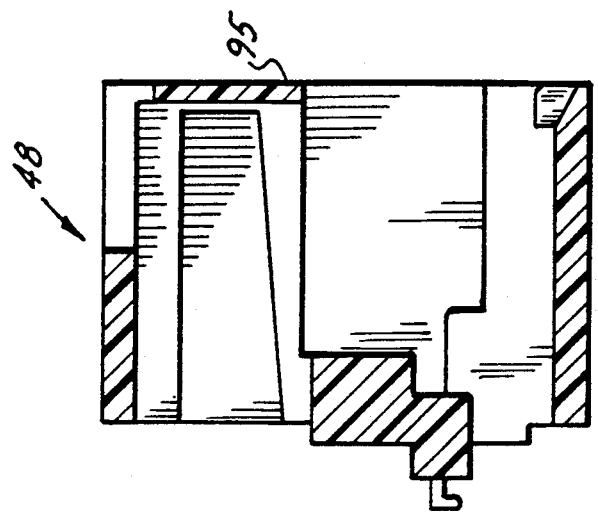
FIG. 17C is a cross-sectional elevation view along the line 17C—17C of FIG. 17B.
Figure 17B:
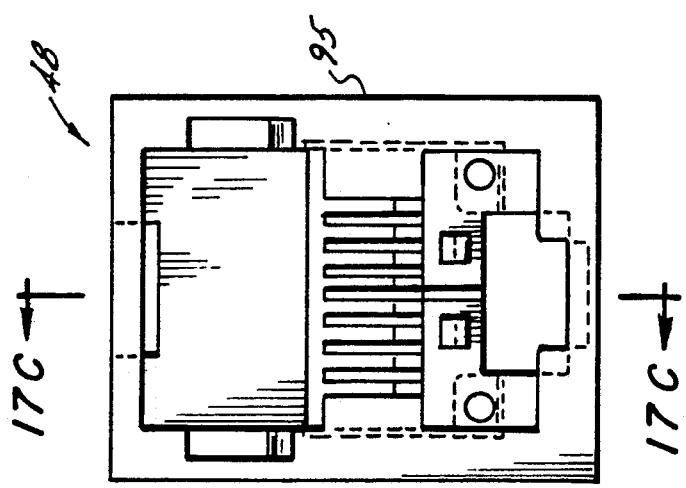
FIG. 17B is a rear elevation view of the modular jack of FIG. 17A (8 wire insert not shown)
Figure 17A:
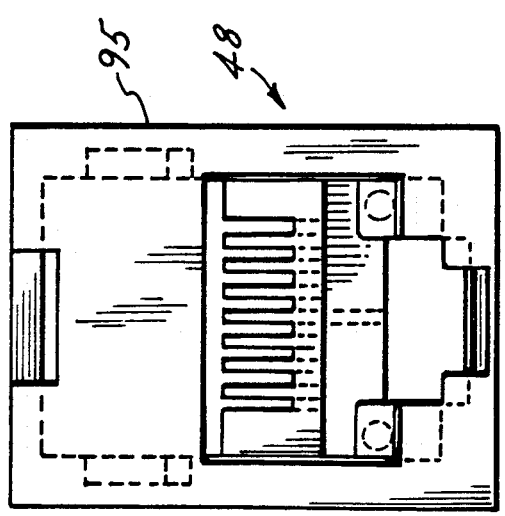
FIG. 17A is a front elevation view of a modular jack in likeness to that used in conjunction with the modular jack connecting block of FIGS. 4-8.

A standard wall phone generally utilizes a two, four or six position (two, four or six wire) modular jack. While suitable for most purposes, there are certain applications wherein an eight position (eight wire) modular jack may be required. The present invention preferably includes a modified eight position modular jack which allows the use of either a two, four, six or eight wire modular plug while still accomodating direct mounting of standard wall telephones. Referring to FIGS. 17A-17C, this modification is accomplished by reducing the size of the outside housing 95 of a standard eight wire modular jack 48 so as to be equal to a conventional or standard two, four or six position jack. Other than the modification to the outside housing 95 of modular jack 48, the remaining structural elements thereof are well known to those skilled in the art and so no further discussion is necessary. The use of a modified modular jack permits the instant invention to be used interchangeably with a wall phone as well as any two, four, six or eight wire modular plug. Thus, whereas the prior art necessitated the use of connecting blocks having a particular modular jack for a particular size modular plug, the modular jack of the present invention may be used with any size modular plug. Alternatively, the present invention may employ a standard two, four, six or eight wire modular jack.

Figure 19:
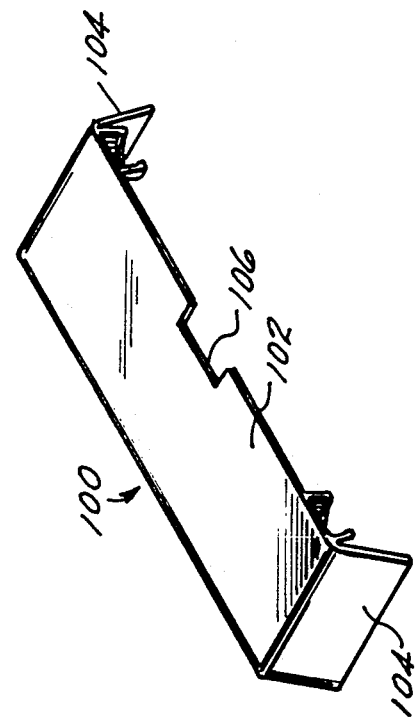
FIG. 19 is a perspective view taken along the line 19—19 of FIG. 18.
Figure 18:
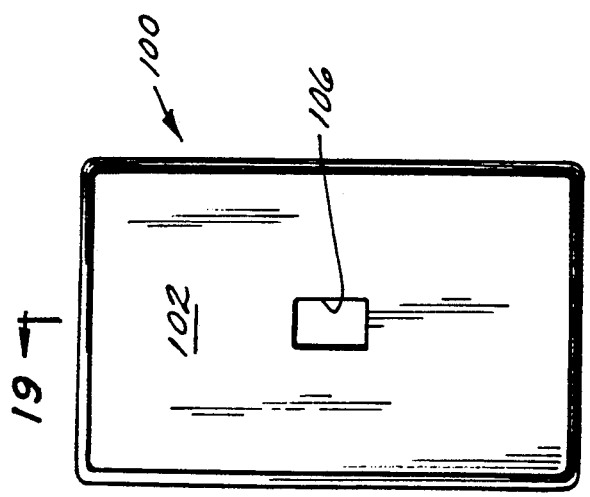
FIG. 18 is a front elevation view of a cover plate used in conjunction with the modular jack connecting block of FIGS. 4-6.

Turning now to FIGS. 18 and 19, an optional decorative and/or insulative cover plate is shown generallY at 100. Cover plate 100 includes a front face 102 with depending sidewalls 104 and a central aperture 106 therethrough. Attachment means allow a snap fit with tabs 41 or studs 50 (FIGS. 4 and 5) while sidewalls 104 allow flush mounting of the cover plate with the modular jack. It will be understood that aperture 106 allows access between a modular plug (not shown) and the modular jack of the connecting block of the present invention. The use of a cover plate 100 such as shown in FIGS. 18 and 19 transform modular jack connecting block 42 into a standard electrical outlet plate sized non-flush mount unit. It will be appreciated that some versions of the connecting plate of the present invention also permit the use of standard electrical outlet plates to be used therewith.

Figure 20A:
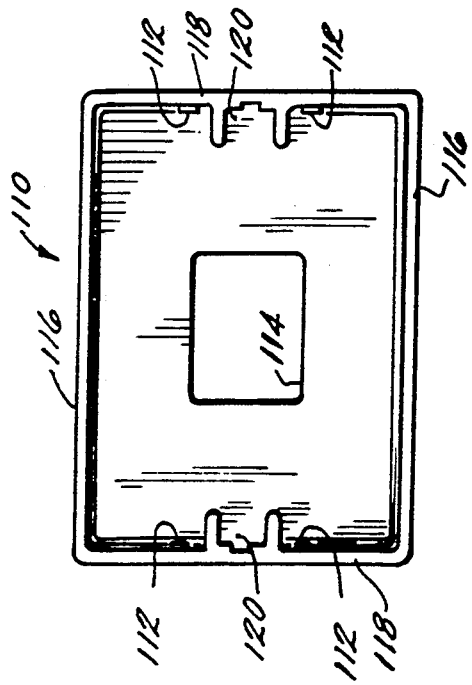
FIG. 20A is a bottom view of another cover plate used in conjunction with the modular jack connecting block of the present invention.
Figure 20B:
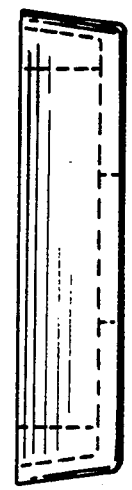
FIG. 20B is a side elevation view of the cover plate of FIG. 20A along the line 20B—20B.

In FIGS. 20A and 20B, a similar decorative and/or insulating cover plate is shown generally at 110. Cover plate 110 is designed to provide a protective covering to separated interior connector plate 55. Cover 110 includes four protrusions 112 for effecting a snap fit over side walls 69 of interior connector plate 55 and a central aperture 114 for permitting access to the modular jack. As with cover plate 100 of FIGS. 18 and 19, cover plate 110 includes depending sidewalls 116 and 118 which also allow flush mounting of the cover plate with the modular jack. Note that sidewalls 118 include inverted U-section 120 which will correspond to the shapes of the voids 56 and 58 which will remain after interior plate 55 has been removed from surrounding plate 42 thereby allowing access to wires being connected to the front of the plate.

Preferably, plate 42 of the present invention includes a slot 122 extending in from the bottom end thereof (See FIGS. 4 and 6). Slot 122 provides a space to slip a telephone or other cable through, during for example, changeover from prior art type wiring (i.e. non-modular plug/jack) to current wiring utilizing modular plugs and jacks. Preferably, the cosmetic cover plate 100 of FIGS. 18 and 19 will be used with plate 42 during this changeover procedure.

The modular jack connecting block 40 of the present invention (including any of the variations discussed hereinabove) may be provided with an optional magnetic backing, sticky wax adhesive or other suitable mounting means so as to facilitate mounting on metal or other flat surfaces, i.e. desks. This magnetic or sticky backing could be in the form of a solid sheet or smaller plural segments. The use of a sticky wax adhesive is particularly advantageous as it permits the present invention to be mounted on almost any type of planar surface.

Referring to FIG. 6, it will be appreciated that the various recesses in plate 42 identified at 124 are for molding purposes only (so as to reduce the amount of manufacturing material), and may or may not be provided to connecting block 40.

Although the present invention has been described in conjunction with a single modular jack, it will be appreciated that more than one jack, i.e., duplex modular jack arrangements, may be utilized with the connecting block disclosed herein. Plural modular jack configuration would, of course, require associated modifications to connecting plate 42, insert 55 and covers 100 and 110.

Figure 21B:
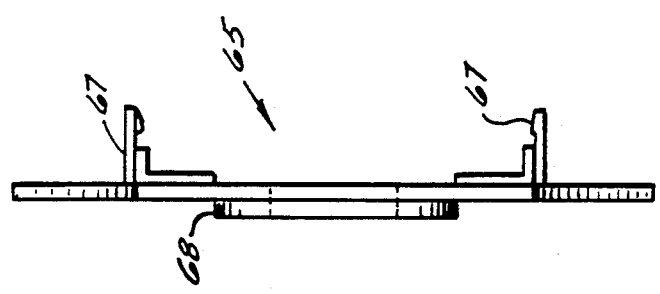
FIG. 21B is a side elevation view of the octagonal insert of FIG. 21A.
Figure 21A:
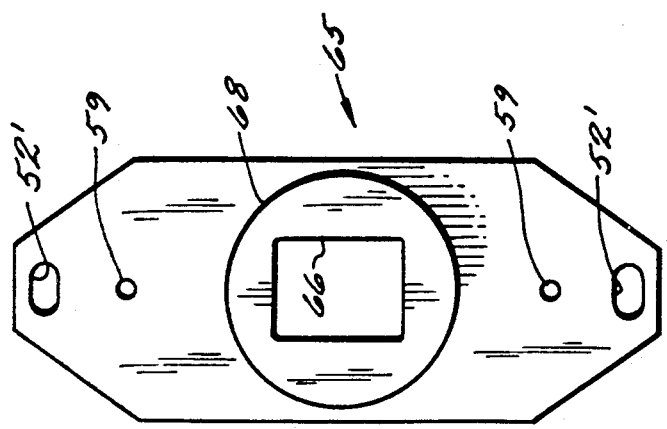
FIG. 21A is a front elevation view of an octagonal insert that may be used in conjunction with the connecting block of FIG. 7.

Referring now to FIGS. 21A and 21B, an octagonal add-on or cover plate portion specifically adapted to snap onto the front face of section 55 is identified at 65. Preferably, octagonal insert 65 is used in conjunction with the rectangular break-out region 55 of connecting plate 42. Octagonal insert 65 includes at least one inner rectangular opening 66, each surrounded by a circular (or oval region) 68. Insert 65 also includes mounting holes 52' which correspond to mounting holes 52 in plate 42 and snap-action mounting means 67. During use, rectangular opening 66 of octagonal insert 65 is disposed over protruding modular jack 48 wherein mounting means 67 will effect a snap fit over the two outside edges 69 of portion 55. Additional mounting holes 59 are provided for a decorative face plate to be attached thereto. Thus, when add-on section 65 is connected to one or two snap-out interior portions 55 of connecting plate 40, a single or dual modular jack connecting device functionally and structurally similar to the connecting devices 12 and 12' of FIG. 2 is created.

The modular jack connecting block 40 of the present invention thus permits one connecting device to be used in applications which have previously necessitated at least three devices (i.e., the devices of FIG. 1, 2, and 3). Accordingly, duplication in manufacturing, purchasing, inventory, etc. is far reduced resulting in great cost savings. Moreover, the installer or repairer in the field need only be provided with one type of modular jack connecting block which can be used in plural applications.

While the novel structure of the present invention combines the functions of at least three types of existing modular jack connecting devices, other structural features heretofore not found in the prior art are also provided which permit block 40 to be used in a large number of applications.

Turning now to FIGS. 22-29, a second embodiment of the present invention will now be described. This second embodiment differs from the first embodiment described in FIGS. 4-21 in that while the first embodiment utilized a block 40 which included the separable interior portion 55 detachably connected thereto, the second embodiment utilizes a connector block very similar to separable interior portion 55 of FIG. 4 which is no longer detachably connected to the larger block frame. In other words, in the second embodiment, the center section becomes the "hub" for the modular connecting block system whereas in the first embodiment, the "hub" comprises the entire plate 42 (with the center section being connected to the surrounding block frame). This difference between the two embodiments will be more readily understandable from the following discussion of the FIGURES.

In FIG. 22, a substantially rectangular modular jack connecting block is shown generally at 200. It will be appreciated that modular jack connecting block is quite similar to the separable interior portion identified at 55 in FIGS. 7 and 8. Since a large number of the elements in connecting block 200 are the same or similar to the elements in separable interior portion 55, those same elements will be identified with the same numbers and the addition of a prime. Thus modular jack connecting block 200 includes a modular jack 48' extending upwardly therefrom and a pair of insulation displacement connecting areas 70' on either side of modular jack 48'. Insulation displacement connector 70' are substantially identical to the insulation displacement connectors described in detail above in conjunction with FIGS. 9-16 and are located, along with modular jack 48', on the front face 43' of block 200. The specific structural and functional description of IDC connectors 70' have already been discussed with regard to IDC connectors 70 and FIGS. 9-16. Block 200 also includes a pair of mounting holes 64' to effect mounting thereof onto baseboards, walls or other nonflush mounting applications. As in the first embodiment, the eight position modular jack 48' is prewired to the quick connect blades 74' provided in the slots 72' of IDC connector 70'. Openings 202 through connector block 200 provide access between the front and back surfaces 43' and 44' of the block for the modular jack wires which are to be terminated onto the blades in the IDC connectors 70'.

In FIGS. 23A and 23B, a decorative and/or insulating cover plate substantially similar to the cover plate of FIGS. 20A and 20B are shown generally at 110'. Cover plate 110' is designed to provide a protective covering to modular jack connector block 200. As mentioned, cover plate 110' is substantially similar to cover plate 110 of FIGS. 20A and 21B and so includes means for effecting a snap fit onto connector block 200 as shown in FIGS. 23B and as discussed in detail above with regard to FIGS. 20A and 20B. Note that cover plate 110' includes depending sidewalls 116' and 118' which permit flush mounting of the cover plate with the modular jack connector block 200. The connector block assembly of FIGS. 23A and 23B are well suited for any type of nonflush surface mount, e.g., baseboards or the like.

Figure 24A:
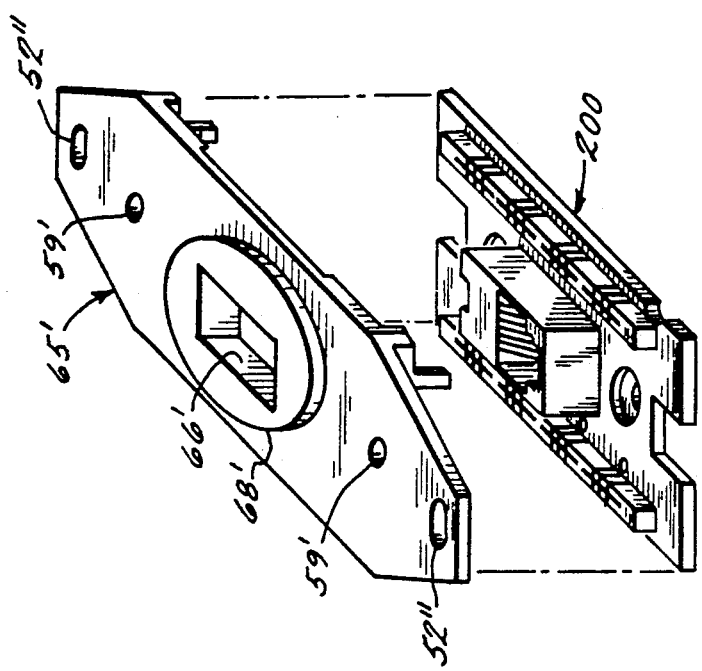
FIG. 24A is a perspective view of the connector block of FIG. 22 used with a second type of cover plate.
Figure 24B:
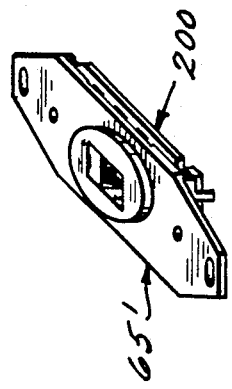
FIG. 24B is a perspective view of the items of FIG. 24A subsequent to assembly.

Referring now to FIGS. 24A and 24B, the modular jack connector block 200 of FIG. 22 is shown used in conjunction with an octagonal add-on or cover portion which, like the cover portion 110' of FIG. 23, is adapted to snap onto the front face of connector block 200. It will be appreciated that the octagonal cover portion 65' is substantially similar to the octagonal add-on or cover portion 65 of FIGS. 9A and 9B. Thus, as previously discussed with regard to cover portion 65, cover portion 65' includes an inner rectangular opening 66' surrounded by a circular (or oval region) 68'. Insert 65' also includes mounting holes 52"at opposed longitudinal ends of plate 65' and a pair of inner holes 59' are provided for a decorative faceplate to be attached thereto. As in octagonal cover plate 65, octagonal cover plate 65' is adapted to effect a snap fit over the outside edges of connector block 200 as shown in FIG. 24B and as discussed in detail above with regard to FIGS. 21A and 21B.

FIGS. 25A and 25B show that multiple connector blocks 200 of FIG. 22 may be used in a duplex octagon adapter similar to that shown in FIG. 24. The two cases of FIGS. 24 and 25 show that, one basic modular connecting block may be used to produce modular connecting blocks equivalent to flush mountable prior art of FIG. 2 with the use of low cost adapters.

Turning now to FIG. 26A, a connector block frame is shown generally at 206. Connector block frame 206 is substantially similar to the outer plate portion 42 of FIG. 4. Thus, frame 206 comprises a substantially rectangular electrically nonconductive (e.g., plastic) annularly configured plate having front and rear faces 43' and 44' respectively. Each corner 45' is preferably diagonally cut and includes an opening or mounting hole 46' for attachment thereof to a wall. Because of the presence of slot 122' extending in from the bottom end of frame 206 (which provides room for a cable or the like), one of the mounting holes 46'' is circular rather than oval. As in the connecting block 42 of FIG. 4, additional mounting holes or openings 52' are positioned in the respective upper and lower center portions of frame 206. It will be appreciated that a pair of connecting tabs or studs 50' such as those shown at 50 in FIG. 4 may also be used with frame 206 for attaching a telephone thereto. Slots 93' are also provided in frame 206 to facilitate the entry and exit of wire conductors. The central portion of frame 206 comprises a substantially rectangular opening 208 which is sized to receive modular jack connector block 200 therein. Angularly configured connector block 200 may be detachably connected within opening 208 by any suitable means. Preferably, a pair of depending arms (one of which is shown at 210 in FIG. 22) engage opposed surfaces of opening 208 whereupon connector block 200 is firmly held within opening 208 of frame 206 as shown in FIG. 26B at 212 wherein frame 206 is substantially coplanar with the front surface of plate 200. It will be appreciated that frame 206 includes eight groups of three slots identified at 214 which correspond to the three slots 73' in IDC connector 70' which act to receive wire conductors being connected to the connector blades in IDC connector 70'.

The assembly 212 of FIG. 26B consisting of the connected modular jack connecting block 200 and frame 206 has an appearance which is substantially similar to modular jack connecting block 40 of FIG. 4. Similarly, the assembly of FIG. 26 may be used for the same applications as modular jack connecting block 40 of FIG. 4. Accordingly, the FIG. 26 assembly may be easily and quickly mounted on a plurality of known brackets and wall boxes as will be clear from a reading of the foregoing description of FIG. 4.

Figure 27B:
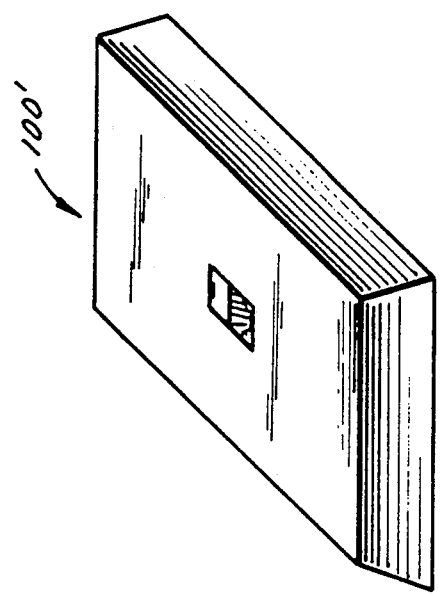
FIG. 27B is a perspective view of the items of FIG. 27A subsequent to assembly.
Figure 27A:
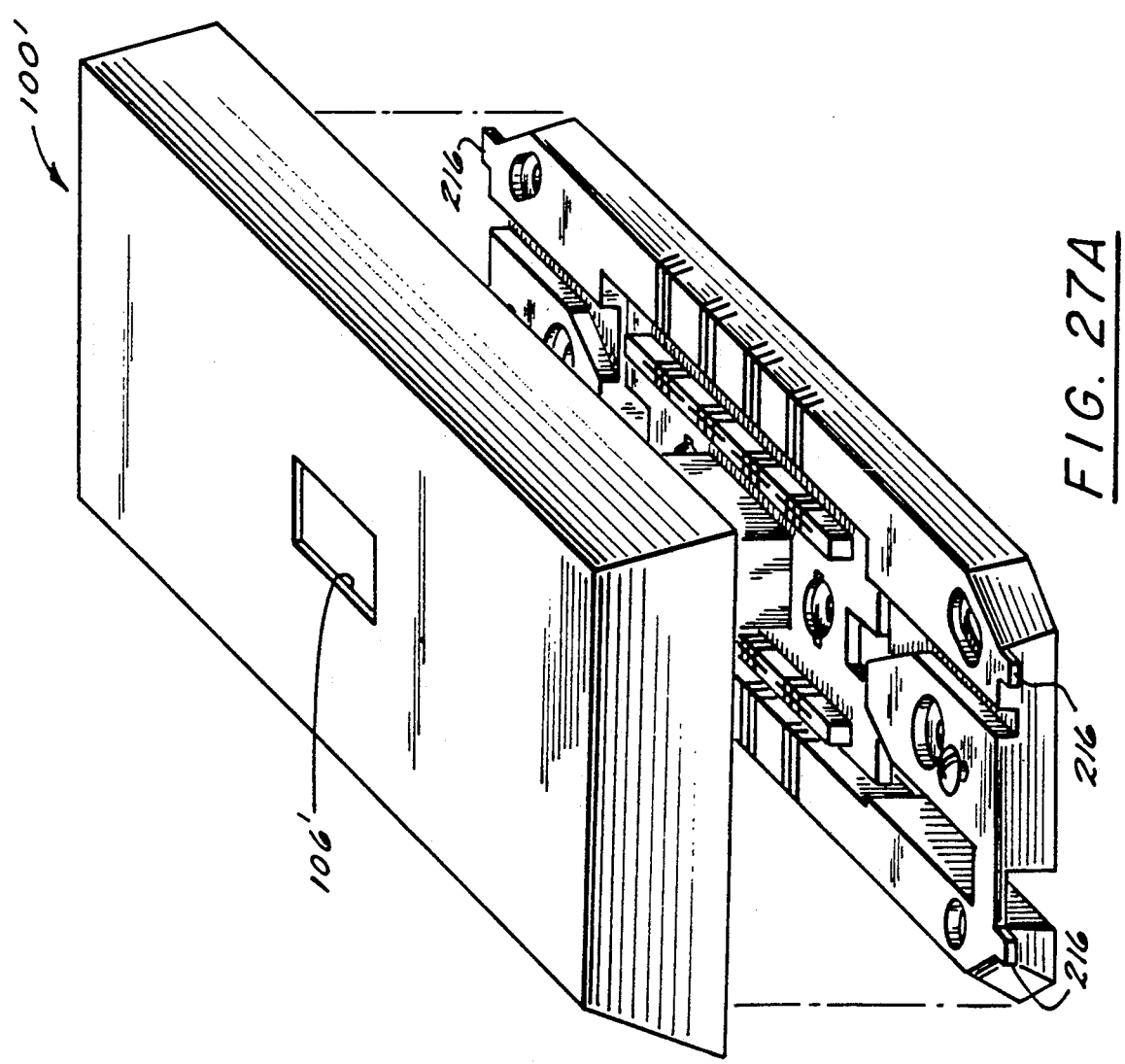
FIG. 27A is a perspective view of the assembly of FIG. 26A used with another type of cover plate.

Subsequent to mounting the connector block 200/frame 206 assembly 212 onto a bracket or wall box, a large decorative or insulating cover may be applied thereto. Referring to FIGS. 27A and 27B, a cover which is substantially similar to the cover identified at 100 in FIGS. 18 and 19 is identified at 100'. In a manner similar to the cover 100 and as explained in detail above with regard to FIGS. 18 and 19, cover 100' effects a snap lock fit onto the connector block 200/frame 206 assembly 212 as shown in FIG. 27B. One method of effecting the snap lock fit is to provide frame 206 with a plurality of outwardly extending extensions 216 which engaged recesses provided to the inside of cover plate 100' thereby effecting the desired snap lock fit.

Figure 28A:
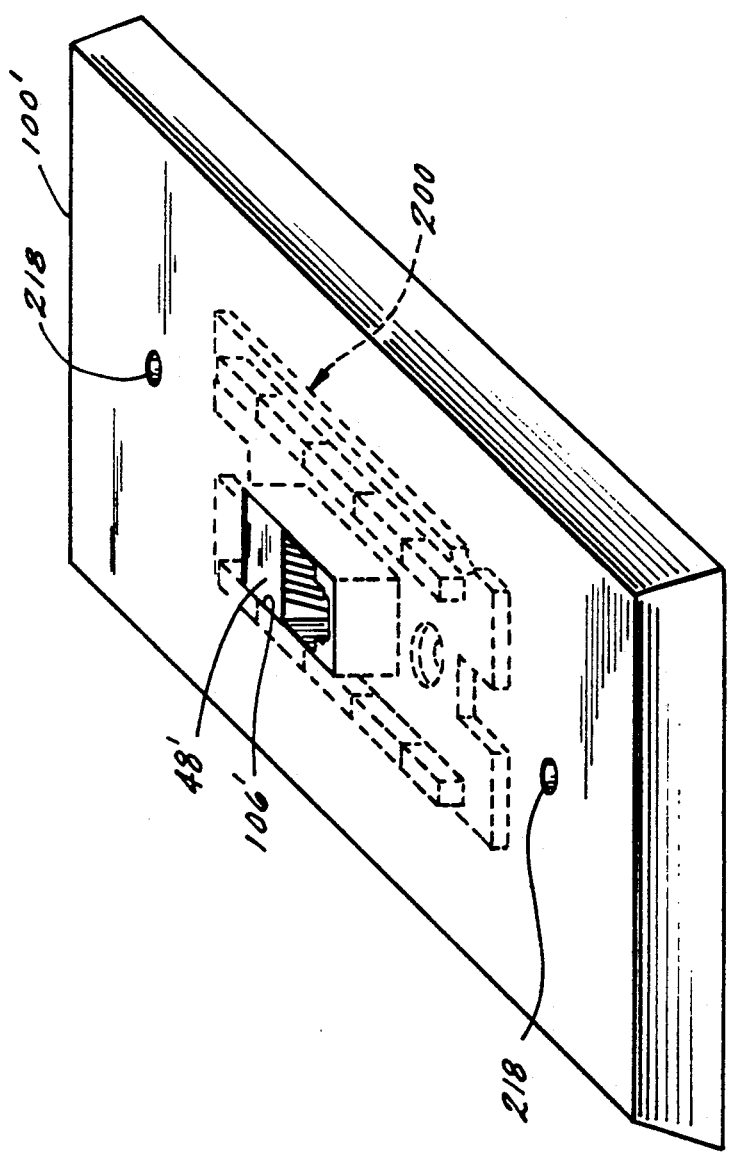
FIGS. 28A and 28B are perspective views of the connector block of FIG. 22 assembled with the third type of cover plate.
Figure 28B:
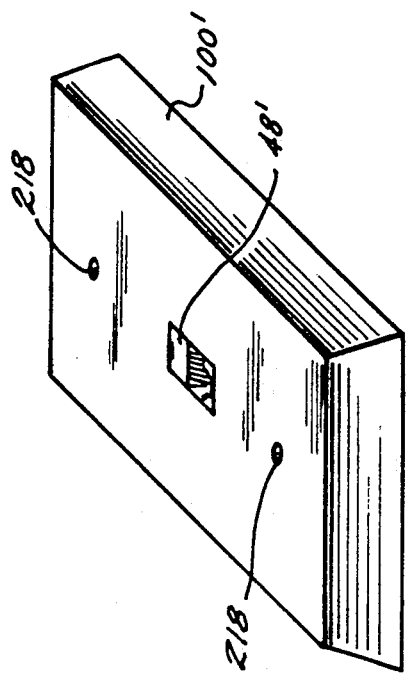
Figure 29B:
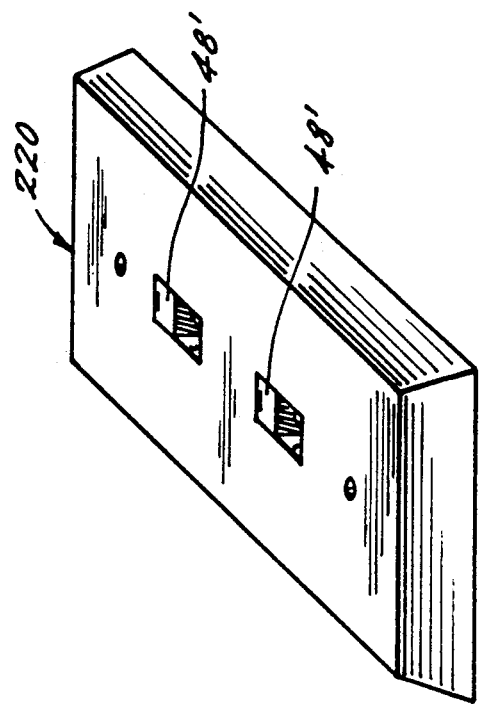
FIGS. 29A and 29B are perspective views of connector block assemblies similar to the assemblies of FIGS. 28A and 28B.
Figure 29A:
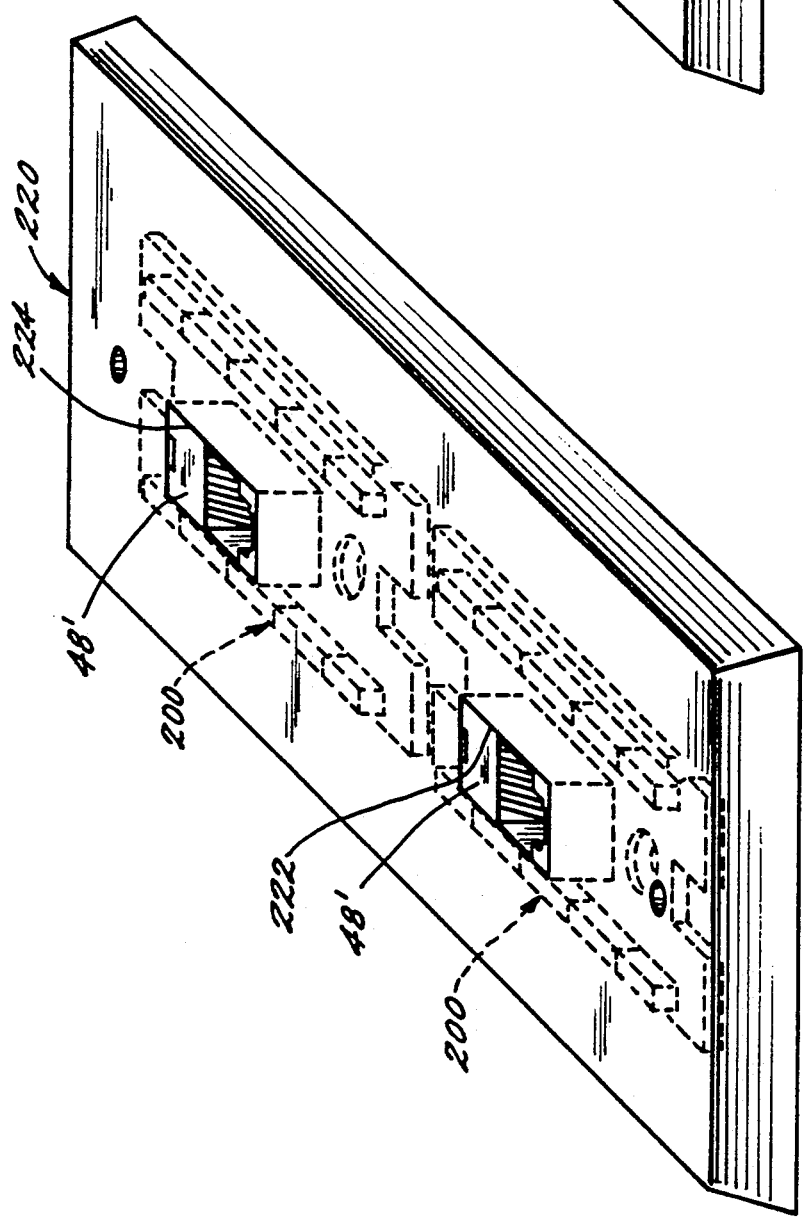

Referring now to FIGS. 28A and 28B, rather than utilizing cover plate 100' with the connector block 200/frame 206 assembly 212, cover plate 100' may be used in conjunction with only the modular jack connector block 200. In this case, the upwardly protruding housing surrounding modular jack 48' will frictionally engage the opening 106' of cover plate 100' whereupon connector block 200 will be engaged with cover plate 100' as shown in FIGS. 28A and 28B. Thereafter, either snap features or a pair of mounting holes 218 may be provided to cover plate 100' for threaded engagement of the connector block 200/cover plate 100' assembly to a wall box or the like.

It will appreciated that a plurality of connector blocks 200 may be used in series to provide duplex outlets or even larger numbers of outlets. For example, in FIGS. 29A and 29B, a pair of modular jack connector blocks 200 are shown in conjunction with a cover plate 220. Cover plate 220 is substantially similar to cover plate 100'. However, an important difference is that cover plate 220 includes a pair of openings 222 and 224 therein which are sized to engage the protruding modular jack housing 48' as was discussed in conjunction with FIGS. 28A and 28B. Of course, openings 222 and 224 must be spaced apart from each other to permit a pair of connector blocks 200 to be positioned and aligned within the interior of cover plate 220. As with cover plate 100', either snap features or openings 226 are provided to permit threaded fasteners or the like to pass therethrough and engage with the connector blocks 200, suitable bracket or wall box. It will be appreciated that any number of modular jack connector blocks 200 may be utilized in conjunction with a cover such as is shown in FIGS. 28A-B and 29A-B with the number of openings through the cover corresponding to the number of modular jack connector blocks to be used therewith.

The modular jack connecting block in accordance with the second embodiment of the present invention as described in FIGS. 22-29 include all of the important features and advantages of the first embodiment. Thus, the modular jack connecting block of the second embodiment of the present invention permits one connecting device to be used in applications which have previously necessitated at least three devices (e.g., the devices of prior art FIGS. 1, 2 and 3). Accordingly, duplication of manufacturing, purchasing and inventory is far reduced resulting in greater cost savings. Additionally, the installer or repairer in the field need only be provided with one type of modular jack connecting block which can be used in plural applications.

Moreover, the second embodiment of the present invention includes several features and advantages over the first embodiment. For example, in the first embodiment, when only the interior separable portion 55 is necessitated, this interior separable portion 55 has to be removed from the surrounding block 42 with the surrounding block portion 42 being disposed of and therefore wasted. Thus, if many separable portions 55 are needed, the resulting waste associated with the disposal of all of the surrounding portions 42 is quite inefficient and costly. However, in contrast, in the second embodiment of the present invention, there is no waste whatsoever associated with using only the smaller portion 200 (which corresponds to the separable portion 55 of the first embodiment). This is because only the modular jack connecting block 200 would be purchased without having to purchase the surrounding frame 206. When only block 200 is used, there is no other frame to dispose of as in the first embodiment. When the surrounding frame portion 206 (corresponding to surrounding plate 42 of the first embodiment) is needed, this surrounding frame 206 is simply obtained and snapped on to modular jack connecting block 200. Consequently, with the second embodiment of the present invention, material waste is at a minimum leading to a more efficient and less costly modular jack connecting block system.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A modular jack connecting device, consisting essentially of:
   modular communication jack means for terminating wire leads and electrically connecting terminated wire leads with corresponding terminals on a modular communications plug;
   first mounting means for removably securing said jack means within an auxilliary frame means for flush mounting the device on a planar surface of a substrate, on a bracket or on an electrical box; and
   second mounting means for flush mounting said jack means on the planar surface of the substrate independent of said auxilliary frame.

2. The device of claim 1 wherein the second mounting means comprises an adhesive composition for bonding said jack means to the surface.

3. The device of claim 1, wherein the first mounting means comprises means for snaplockedly engaging the auxilliary frame means.

4. The device of claim 1, further comprising:
   cover means for covering said jack means.

5. A modular jack connecting device, comprising:
   modular communication jack means for terminating wire leads and electrically connecting terminated wire leads with corresponding terminals on a modular communications plug, said jack means including:
   a conventional modular jack having a plurality of terminals;
   a mounting plate, said mounting plate having a front surface and an opposed substantially planar back surface, secured to said jack so that the jack does not project beyond the back surface of the plate;
   connector means disposed on the front surface of the plate for terminating wire leads in electrical connection with the terminals of the jack; and
   openings through said plate for allowing access for wire leads from the back surface to the connector means;
   first mounting means for independently flush mounting the device on a planar surface; and
   second mounting means for removably securing said jack means within an auxilliary frame means for flush mounting the device on a planar surface, on a bracket or on an electrical box.

6. The device of claim 5 wherein the first mounting means comprise a hole through the plate.

7. The device of claim 5 wherein the first mounting means comprises an adhesive composition for bonding the jack means to the surface.

8. The device of claim 5 wherein the second mounting means comprises means for snaplockedly engaging the auxilliary frame means.

9. The device of claim 5, further comprising:
   cover interface means for mounting a cover over the jack means; and
   cover means for covering the jack means.

10. A modular jack connecting device, comprising:
    frame means for flush mounting the device on a planar surface of a substrate, on a bracket or on an electrical box, said frame means having a front face and an opposed rear face and including a central opening through both faces of the frame means, and
    modular communications jack means, removably securable within the central opening of said frame means and flush mountable on a planar surface of a substrate independent of said frame means, for terminating wire leads and electrically connecting terminated wire leads with corresponding terminals on a modular communications plug;
    said device providing a plurality of alternative mounting configurations.

11. A modular jack connecting device, comprising:
    frame means for flush mounting the device on a planar surface, on a bracket or on an electrical box, said frame means having a front face and an opposed rear face and including a central opening through both faces of the frame means; and
    modular communication jack means, removably securable with the central opening of said frame means and independently flush mountable on a surface, for terminating wire leads and electrically connecting terminated wire leads and electrically connecting terminated wire leads with corresponding terminals on a modular communications plug;
    said jack means comprising: a conventional modular jack having a plurality of terminals;
    a mounting plate having opposed front and back surfaces, said back surface being substantially planar, secured to said conventional modular jack so that the jack does not project beyond the back surface of the plate;
    connector means on the front surface of the plate for terminating wire leads in electrical connections with the terminals of the jack;
    openings through said plate for allowing access for wire leads from the back surface to connector means;
    first mounting means on the plate for independently flush mounting said jack means on a surface; and
    second mounting means on the plate for snaplockedly removably securing said jack means to the frame means;
    said device providing a plurality of alternative mounting configurations.

12. The device of claim 11, wherein the connector means comprises:
    a longitudinal slot in the plate;
    a pair of longitudinal sidewalls extending along the longitudinal slot and protruding outwardly from the front face of the plate;
    a plurality of parallel slots extending perpendicularly across each of the side walls;
    connector blade means disposed in said longitudinal slots;

insulation displacement means for effecting electrical contact between the connector blade and a wire lead; and cover means for covering said longitudinal sidewalls connector blade means and longitudinal slot and urging wire leads toward said insulation displacement means.

13. The device of claim 11, further comprising:

cover means for covering said frame means and modular communicating jack means, said cover means including an opening for allowing access by a modular communicating plug to the modular communicating jack means.

* * * * *

UNITED STATES PATENT AND TRADEMARK OFFICE
CERTIFICATE OF CORRECTION

PATENT NO. : 5,008,931

DATED : April 16, 1991

INVENTOR(S) : Carl Siemon and Stephen Thomas

It is certified that error appears in the above-identified patent and that said Letters Patent is hereby corrected as shown below:

On the title page:

| | |
|---|---|
| In the Title | Delete "CONNECTION" and replace with -- CONNECTING--. |
| In Col 1, line 10 | Delete "Nov. 1, 1985, new" and insert therefore -- March 1, 1985, now--. |
| In Col 1, line 47 | Change "Provide" to -- provide --. |
| In Col 2, line 15 | Change "IN" to -- In --. |
| In Col 2, line 42 | Change "in" to -- with --. |
| In Col 3, line 2 | Insert -- a -- before "single". |
| In Col 4, line 39 | Delete "non-known flush" and replace with -- known non-flush--. |
| In Col 4, line 41 | Delete "generallY" and replace with -- generally --. |
| In Col 4, line 42 | Delete "Phones" and replace with -- phones--. |
| In Col 4, line 67 | Change "25" to -- 26--. |

UNITED STATES PATENT AND TRADEMARK OFFICE
CERTIFICATE OF CORRECTION

PATENT NO. : 5,008,931

DATED : April 16, 1991

INVENTOR(S) : Carl Siemon and Stephen Thomas

It is certified that error appears in the above-identified patent and that said Letters Patent is hereby corrected as shown below:

In Col 5, line 30    Change "manufactures" to -- manufacturer--.

In Col 7, line 15    Insert -- ,-- between "4" and "7".

In Col 7, line 46    Delete "therefor" and insert therefore -- therefore--.

In Col 8, line 3     Replace "accomodating" with -- accommodating--.

In Col 8, line 23    Delete "generallY" and insert therefore -- generally--.

In Col 11, line 12-13  Delete "annularly configured".

Signed and Sealed this

Eighth Day of June, 1993

Attest:

MICHAEL K. KIRK

Attesting Officer

Acting Commissioner of Patents and Trademarks